Figure 1:
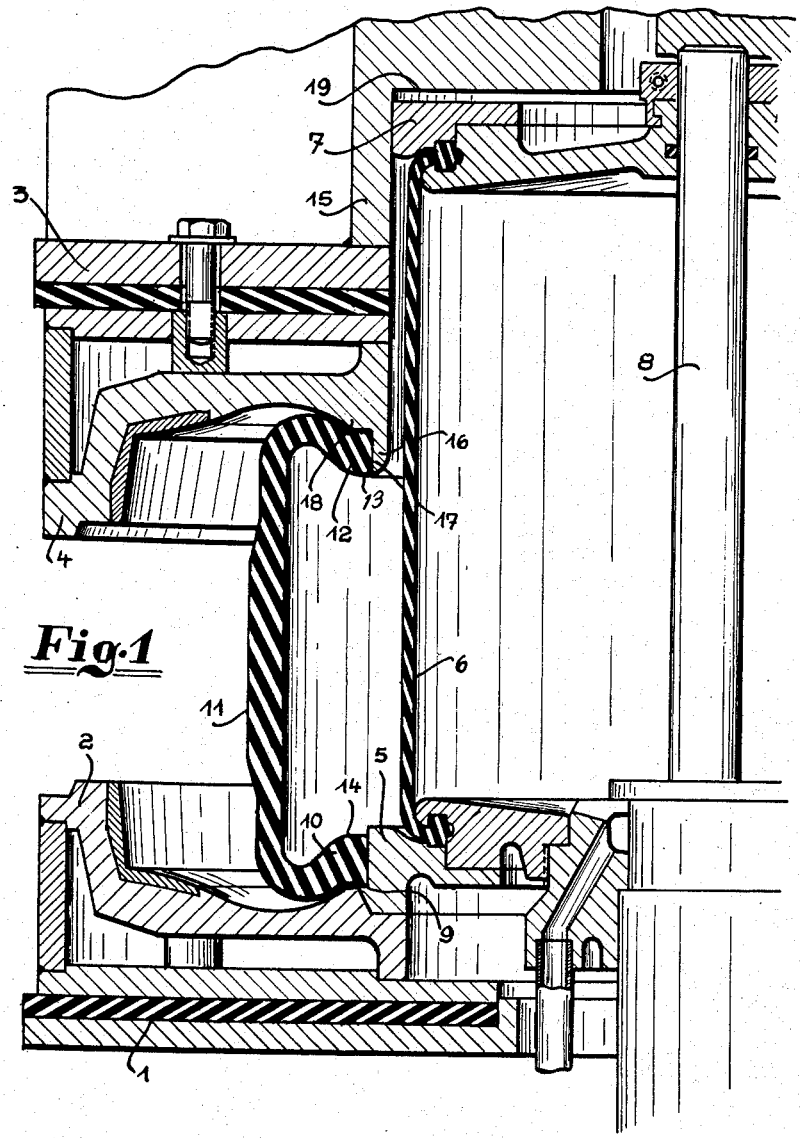

United States Patent Office 3,071,811
Patented Jan. 8, 1963

3,071,811
VULCANIZATION PRESS FOR VEHICLE TIRES
Adolf Herbert, Scheidstr. 2, Frankfurt am Main, Germany
Filed Jan. 27, 1960, Ser. No. 5,076
Claims priority, application Germany Jan. 27, 1959
2 Claims. (Cl. 18—17)

For some years, the manufacture of vehicle tires has been carried out as a rule by the so-called flat process, according to which the tire is built up successively of the individual components in the form of a cylindrical cover. The cylindrical tire band is then brought to the final form and vulcanized in one operation in a distensible member vulcanizing press.

In the usual distensible member vulcanizing presses, the distensible member in the extended position has the height of the cylindrical tire band, so that the latter is supported by the two beads on the lower and upper carrying rings of the distensible member, and so that with the closing of the press, the press cover moves the upper carrying ring towards the lower carrying ring, the distensible member and the tire band surrounding being bulged.

In so-called high-shoulder tires, the bead edges of the flat built-up tire band are constricted or drawn in more or less, however, relatively to its cylindrical cover form. The height of these tire bands is therefore considerably less than that of the inner sheath. Since, however, the height of the extended distensible member must correspond at least to the inner sheath height of the tire band, so that when the press is closed the distensible member will be applied with pressure against the inner wall of the tire, when the tire band is placed over the extended distensible member, the latter projects more or less from the tire band. If, therefore, when rounding out these high-shoulder tires, the rounding-out process is initiated solely by the closing movement of the press cover, there is a danger that on the first exclusively downward movement of the upper carrying ring of the distensible member, the portion of the latter projecting beyond the upper edge of the still cylindrical tire band will be pinched between the upper bead ring of the tire band and the upper carrying ring or the press cover pressing the latter down, especially since the press cover, resting on the upper carrying ring, prevents the operator from making a close observation.

It has therefore also already been proposed to control the inflation of the distensible member for a first working distance, independently of the closing movement of the press cover, the distensible member being first drawn in by a special drive to the height of the tire band, and the press cover being only then applied to the upper carrying ring of the distensible member and determining the subsequent course of the shaping of the tire band. This construction affords the possibility of being able to observe the first part of the downward movement of the upper carrying ring of the distensible member in order, in the event of any pinching, to be able to counteract any defective drawing-in of the distensible member by reversing the control. Correct drawing-in of the part of the distensible member projecting beyond the tire band into the latter, in this construction of the drive, is also dependent solely on the attentiveness of the operator.

The same problem is encountered in distensible member vulcanising presses used for re-treading worn tires or vulcanising circularly built-up tires. In this case, the tires to be provided with the new vulcanised tread has already the final or approximately the final three-dimensional form. The tire can therefore be placed over the distensible member only when the latter has been extended, in which case, it is necessary to take precautions to ensure that the distensible member is inserted into the tire at the latest when the press cover carrying the upper press mould half has reached the closure position.

The invention relates to a new construction of these vulcanizing presses provided with a distensible member, in which any pinching of the portion of the distensible member projecting beyond the tire in the opening position of the press is prevented with certainty.

For this purpose, according to the invention, in a vulcanizing press having a lower press table carrying the lower press mould half and an upper press cover, carrying the upper press mould half, and a distensible member arranged centrally relatively to the lower press mould half, the upper carrying ring of said distensible member being movable from a working position effecting the convexity of said member into a delivering or receiving position of the press mould lower half, in which the distensible member is extended into a cylindrical form, the drive of the press cover being independent of the drive of the upper carrying ring for the extensible member, the press cover is provided with a cylinder attachment for piston-guiding of the upper carrying ring of the distensible member. The cylinder attachment opens below in a centering projection, which on closing of the press, lies in the upper bead ring of the flat band. Advantageously, the depth of the cylinder attachment is such that it is at least equal to the difference between the height of the distensible member and the width of the cylindrical flat band. Advantageously, the drive of the press cover is so designed that its vertical stroke length is greater than the extending distance of the distensible member, and in the open end-position, the cylinder attachment is fully retracted from the upper carrying ring.

Due to this construction, after the cylindrical tire band has been placed over the extended distensible member, the press cover, in the extended position of the member, can be lowered until the centering projection of the upper press mould half has been inserted into the upper bead ring of the tire band. During this part of the closing movement, the upper carrying ring of the distensible member moves upwardly in the cylinder attachment. Then, on continuation of the closing movement of the press cover, the upper carrying ring is moved downwardly in the cylinder attachment, the distensible member being put under internal pressure at the same time. Due to this intrinsic movement of the upper carrying ring relatively to the press cover, which can be effected by loading the upper carrying ring from above by pressure medium, or by a downwardly directed pull on the lift rod supporting the carrying ring, the distensible member is forced into the bulging tire on further closing of the press cover. At the same time, it slides over a rounded portion on the lower edge of the centering projection. This construction results in a careful treatment of the distensible member, any pinching during the closing operation being prevented. Furthermore, the drive for the distensible member is constructed in known manner so that the pull rod supporting upper carrying ring is moved upwardly with the opening of the press cover for the withdrawal of the distensible member from the completed tire until the member has reached its extended position whereupon, while retaining the extended position of the distensible member, the lower carrying ring is also raised for lifting the tire out of the lower press mould half. After the tire has been lifted out, the lower carrying ring returns to its seat in the lower press mould half, the distensible member being retained in the extended position. It is, however, also possible to use any other sequence of the movement of the two carrying rings in the opening of the press, which will result in the withdrawal of the distensible member from the tire and the ejection of the latter from the lower press mould half.

If desired, the lower carrying ring may be fast in the lower press mould half, in which case the completed tire is detached by hand from the lower press mould half and lifted over the extended distensible member.

The new press construction may also be used to advantage for vulcanizing re-treated or circularly built-up tires, in which the tire is already available in substantially the final form. In order, however, in this mode of application, to shorten the opening distance of the press cover—the press cover must of course be opened so far as to release the extended distensible member for lifting off the tire—it is then advantageous for the lower carrying ring, loosely inserted in the lower press mould half, to be carried by a lift rod, which is received by an extension of the cylinder attachment, while the upper carrying ring is slidable on the lift rod and is acted upon by a pressure medium.

Thus, with the opening of the press cover, the lower carrying ring is lifted out of the lower press mould half, so that the tire can be lifted off laterally below said ring. The total stroke travel of the press cover is then substantially only half the width of the completed tire plus the amount by which the lower carrying ring projects beyond the underside of the press cover.

The new construction is explained more fully hereinafter with further features, with reference to the drawing showing, in axial section in each case, in FIG. 1 the application of the invention in a vulcanizing press for the manufacture of flat build-up high-shoulder tires and FIG. 2 the application of the invention for the repair of worn tires or the vulcanization of circularly built-up tires.

In the construction according to FIG. 1, the press comprises a lower stationary press table 1, with lower press mould half 2 mounted rigidly thereon, and an upper press cover 3 carrying the upper press mould half 4. The construction is also devised in known manner so that on opening of the press, the press cover is lifted axially relatively to the lower press mould half and is then swung away to the rear, while in the closing operation, the two part movements of the press cover take place in the reverse sequence.

The lower press mould half 2 receives in central arrangement a lower carrying ring 5 for a distensible member 6, the upper edge of which is clamped in an upper carrying ring 7. The upper carrying ring 7 is carried by a piston rod 8, adapted to be shifted by a pressure-medium drive, not shown.

The lower carrying ring 5 is provided with a supporting shoulder 9 for the lower bead edge 10 of the flat tire band 11. In these high shoulder tires, the internal diameter of the flat band 11 is much greater than the internal diameter of the two tire beads 10, 12. Consequently, the development length of the height of the inner wall of the flat band from one bead toe 13 to the other bead toe 14 is also much greater than the overall height of the flat band 11.

Since the distensible member 6 in the extended position must at least have a height corresponding to the development length from one bead toe 13 to the other bead toe 14, it projects beyond the flat band by a considerable amount in the extended position. In the closing operation of an ordinary press, the upper press cover 3 with the upper press mould half 4 already rests on the upper carrying ring 7 when the upper press mould half 4 does not yet bear on the upper bead ring 12, and on the further closing operation, however, the distensible member with reduction in the distance between the two carrying rings 5, 7, will already be convexed, and there is a danger of the said member being pinched between the upper press mould half 4 and the upper bead ring 12.

According to the invention, the press cover 3 is provided with a cylindrical attachment 15, in which the upper carrying ring 7 is guided slidably as a piston. The upper press mould half 4 has on the internal diameter a downwardly projecting annular nose 16. The height of the cylinder attachment 15 extended by the annular nose 16 is so dimensioned that on the downward movement of the press cover 3 with the upper press mould half 4, at the commencement of the axial movement relatively to the lower press mould half 2, the curved inlet surface 17 of the annular nose 16 engages the upper carrying ring 7, and the cylinder attachment 15 then descends relatively to the upper carrying ring 7. Finally, the annular nose 16 is inserted into the upper bead ring 12. In the inserted end position, in which the shoulder 18 rests on the upper bead ring 12, the upper carrying ring 7 is given an intrinsic downward movement relatively to the press cover 3 continuing the closing movement and the cylinder attachment 15, for example by the lift rod 8 being drawn downwardly by a drive then to be switched on. At the same time, the distensible member 6 is put under internal excess pressure. With the resulting distension of the member 6, the latter moves over the curved surface 17 into the annular space defined by the tire tread 11 and pinching of the member 6 between the upper tire ring 12 and the upper press mould half 4 is prevented with certainty.

The same problem is encountered in the vulcanisation of repaired or circularly built-up tires in expansible bag presses, since the tire to be provided with the new tread and to be vulcanised has already the final or approximately the final tire form. It is here a matter of delaying the bulging of the member 6 until the upper press mould half 4 rests on the tire 11a, i.e. the press is already closed.

Figure 2:
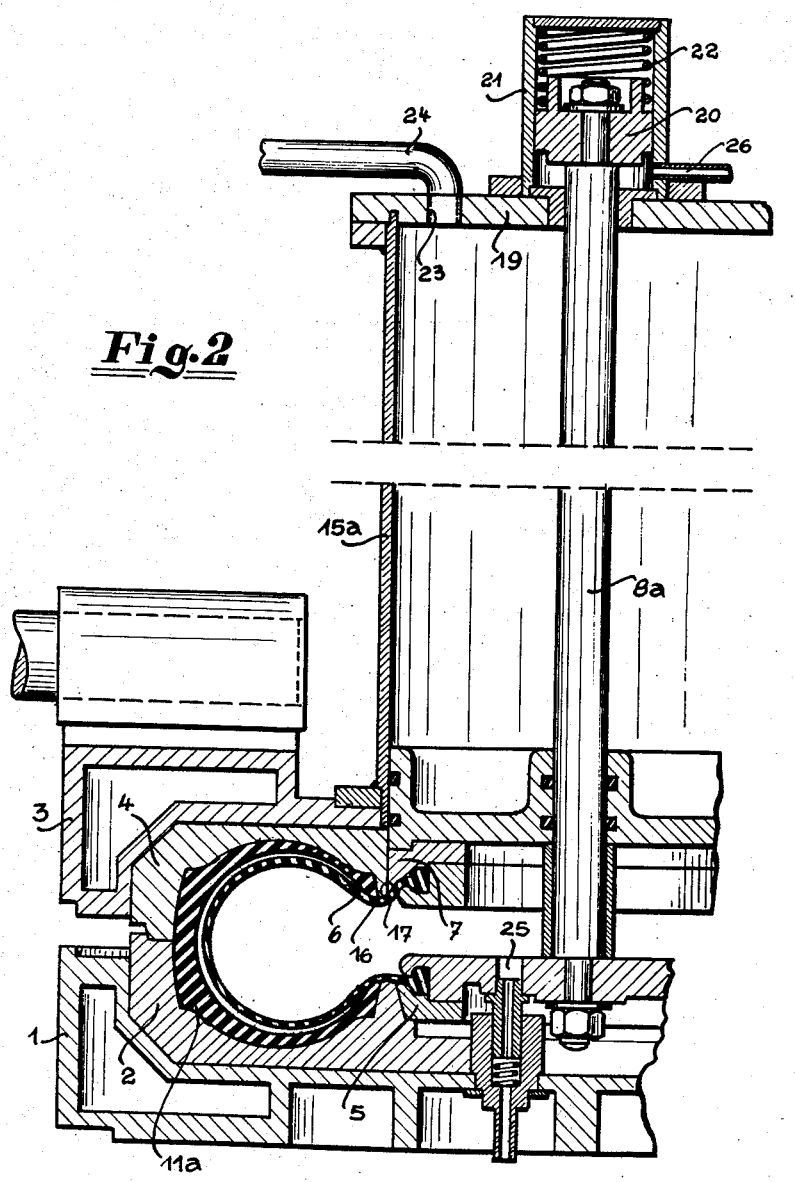

FIG. 2 shows a distensible member vulcanizing press for vulcanizing repaired or circularly built-up tires. Here again, the press table 1 receives the lower press half 2, while the press cover 3, adapted to be swung in relatively to the press table and to be lifted off the latter, carries the upper press mould half 4. The upper press mould half 4 has a downwardly extending internal nose ring 16, which with the cylinder attachment 15a of the press cover 3, forms a cylinder in which the upper carrying ring 7 is guided as a piston.

The upper carrying ring 7, however, is slidably carried by a piston rod 8a, to the lower end of which is fixed the carrying ring 5. The piston rod 8 carries on its upper end a piston 20, which is guided in a further cylinder 21 mounted on the cover 19 of the cylinder 15a, and is loaded by a spring 22. The cylinder 21 can be connected to a source of compressed gas by means of a pipe line 26 opening below the piston 20, so that therefore the piston 20 can be moved upwardly in the cylinder 21 under the effect of the compressed gas against the action of the spring 22.

The height of the cylinder 15a is so dimensioned that the extended member 6 can be accommodated therein. The height of the cylinder 21 is selected so that in the extended position of the member 6, the piston rod 8a with the lower carrying ring 5 can be lifted out of its seat in the lower press mould half, the extended position of the member 6 being retained. The cylinder cover 19 is also provided with a hole 23 for the connection of a compressed air and suction pipe 24.

FIG. 2 shows the press in the closed position. For opening the press, the compressed air pipe 24 is connected to a source of suction, the steam pressure in the bag 6 being removed, so that the upper carrying ring 7 is drawn upwardly in the cylinder 15a, and the member 6 is extended and withdrawn from the tire. As soon as the member 6 has reached the extended position, the drive for the lifting movement of the press cover 3 is started. Due to this lifting movement, the piston rod 8a and the lower carrying ring 5 are also moved upwardly, so that the latter is lifted out of its seat in the lower press mould half.

I claim:
1. In a tire vulcanizing press, a laterally distensible vertical axis tubular member operating by side expansion and contraction in conjunction with tire carcass forming molds, including a stationary lower mold half and a coaxial vertically movable upper half mold, an annular nose fixed on and depending from the upper mold half and projecting below the contiguous mold surface and presenting, in radial vertical cross section, a radially outer straight tire bead abutting surface of the same height dimension as the inner width dimension of a tire bead, said nose further characterized by a radially inner upwardly curved surface whose lowest part is horizontal and which curves evenly therefrom until it merges vertically with the inner face of the upper mold half, a vertically movable coaxial ring carrying the top end of the tubular member, said ring being movable with respect to and always remaining above the nose, the nose thus presenting a smooth upper and outer annular surface to engage with the tubular member as it stretches and moves therepast, whereby when fluid pressure is applied within the tubular member causing it to expand sidewardly, and when fluid pressure is released from within the tubular member and the ring is moved upwardly causing the member to contract sidewardly, the tubular member is guided smoothly respectively out and in over the curved mold face and the contiguous lower inner surface of the bead, and pinching of the member is prevented, even upon the closing of the molds.

2. The structure of claim 1, wherein the upper mold half fixedly carries a downwardly open cylinder for guiding the said carrier ring and tubular member, an axial piston rod passing through and beyond the ends of the cylinder, the said ring being fixed to a piston, the piston being slidable with respect to both the cylinder and piston rod, a conduit leading from the top of the cylinder to a source of suction and compressed air to raise and lower the piston and its connected structures, the lowermost end of the piston fixedly carrying a disc with a second carrier ring, the latter ring fixedly carrying the bottom of the tubular member, and being seated on the lower mold half when in its lowest position, the piston rod being provided at its top with compressible means to bias it and the second carrier ring downwards with respect to the cylinder to gently seat the latter ring, and fluid pressure means to bias the rod and the second carrier ring upwards with respect to the cylinder to aid in unseating the second ring from the lower mold, and means to admit and exhaust a heated fluid to and from the interior of the distensible tubular member.

References Cited in the file of this patent
UNITED STATES PATENTS
2,741,799  Heston _____ Apr. 17, 1956
FOREIGN PATENTS
215,704  Australia _____ Apr. 14, 1958